US011605221B2

(12) United States Patent
Badr

(10) Patent No.: US 11,605,221 B2
(45) Date of Patent: Mar. 14, 2023

(54) MULTI-ANGLE OBJECT RECOGNITION

(71) Applicant: Google LLC, Mountain View, CA (US)

(72) Inventor: Ibrahim Badr, New York, NY (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/839,104

(22) Filed: Jun. 13, 2022

(65) Prior Publication Data
US 2022/0309781 A1 Sep. 29, 2022

Related U.S. Application Data

(63) Continuation of application No. 17/062,983, filed on Oct. 5, 2020, now Pat. No. 11,361,535, which is a
(Continued)

(51) Int. Cl.
G06V 10/98 (2022.01)
G06V 10/24 (2022.01)
(Continued)

(52) U.S. Cl.
CPC ............ G06V 10/98 (2022.01); G06V 10/24 (2022.01); H04N 5/23206 (2013.01);
(Continued)

(58) Field of Classification Search
None
See application file for complete search history.

(56) References Cited

U.S. PATENT DOCUMENTS 9,836,483 B1 12/2017 Hickman et al.
10,269,155 B1 * 4/2019 Brailovskiy ............... G06T 5/50
(Continued)

FOREIGN PATENT DOCUMENTS

CN 104854616 8/2015
CN 104854616 A * 8/2015 .......... G01M 5/0033
(Continued)

OTHER PUBLICATIONS

International Preliminary Report on Patentability for Application No. PCT/US2019/045083, dated Feb. 18, 2021, 8 pages.
(Continued)

Primary Examiner — Mohammed Rachedine
(74) Attorney, Agent, or Firm — Dority & Manning, P.A.

(57) ABSTRACT

Methods, systems, and apparatus for controlling smart devices are described. In one aspect a method includes capturing, by a camera on a user device, a plurality of successive images for display in an application environment of an application executing on the user device, performing an object recognition process on the images, the object recognition process including determining that a plurality of images, each depicting a particular object, are required to perform object recognition on the particular object, and in response to the determination, generating a user interface element that indicates a camera operation to be performed, the camera option capturing two or more images, determining that a user, in response to the user interface element, has caused the indicated camera operation to be performed to capture the two or more images, and in response, determining whether a particular object is positively identified from the plurality of images.

19 Claims, 6 Drawing Sheets

Related U.S. Application Data continuation of application No. 16/058,575, filed on Aug. 8, 2018, now Pat. No. 10,803,336.

(51) Int. Cl.
*G06V 10/776* (2022.01)
*G06V 10/22* (2022.01)
*H04N 5/232* (2006.01)
*H04N 5/265* (2006.01)

(52) U.S. Cl.
CPC ..... *H04N 5/23218* (2018.08); *H04N 5/23222* (2013.01); *H04N 5/232933* (2018.08); *H04N 5/23238* (2013.01); *H04N 5/265* (2013.01)

(56) References Cited

U.S. PATENT DOCUMENTS

| | | | |
|---|---|---|---|
| 10,540,390 B1 | 1/2020 | Angel et al. | |
| 2005/0189411 A1* | 9/2005 | Ostrowski | G07G 3/00 |
| | | | 235/383 |
| 2010/0253787 A1* | 10/2010 | Grant | H04N 5/23203 |
| | | | 348/207.1 |
| 2012/0327174 A1 | 12/2012 | Hines et al. | |
| 2017/0142320 A1* | 5/2017 | Ito | H04N 21/6377 |

FOREIGN PATENT DOCUMENTS

| | | | | |
|---|---|---|---|---|
| CN | 108756504 | | 11/2018 | |
| CN | 108756504 A | * | 11/2018 | ............. E05B 17/22 |
| CN | 105025208 | | 12/2018 | |
| CN | 105025208 B | * | 12/2018 | ......... H04N 5/23203 |
| CN | 108320401 | | 2/2021 | |
| CN | 108320401 B | * | 2/2021 | ............ G07F 19/201 |
| WO | WO 2017/080294 | | 5/2017 | |
| WO | WO-2017080294 A1 | * | 5/2017 | ............... G06T 3/40 |

OTHER PUBLICATIONS

International Search Report and Written Opinion for PCT/US2019/045083, dated Oct. 23, 2019, 13 pages.
Lowe, "Object Recognition from Local Scale-Invariant Features", pp. 1-8, International Conference on Computer Vision, 1999.

* cited by examiner

MULTI-ANGLE OBJECT RECOGNITION

PRIORITY CLAIM

The present application is a continuation of U.S. application Ser. No. 17/062,983 having a filing date of Oct. 5, 2020, which is a continuation of U.S. application Ser. No. 16/058,575 having a filing date of Aug. 8, 2018. Applicant claims priority to and the benefit of this application and incorporates the application herein by reference in its entirety.

BACKGROUND

Many mobile devices, such as smartphones, come equipped with a camera for capturing pictures and digital images. Mobile devices provide access to a wide variety of information. This information may be viewed in web browsers or native applications running on a mobile device. Users can also use the images to obtain additional information related to an object or location. For example, digital image files, video and/or audio files, as well as resources for particular subjects are accessible over the Internet.

Object recognition software is used to detect and identify objects in an image or video sequence. Processes for object recognition of an image or video sequence often employ various distinct steps for analyzing an image to positively identify an object within the image.

Once a user has selected an image in which to look for objects of interest, the object recognition software running in the background of a mobile device and/or on a server will operate without user feedback during the process of identifying objects within the image. Oftentimes a lack of user feedback during the object recognition software leads to imperfect object recognition including incorrect identification, no positive identification, or an undesired object being identified within the image or video sequence. However, without direct visual indicators of the process of object recognition displayed within the candidate image on a mobile device, the user can have little understanding of the object recognition process and cannot give important feedback to assist in the object recognition process.

SUMMARY

This specification describes technologies relating to representing an object recognition process in real-time using user interface elements to a user viewing the image on a mobile device.

In general, one innovative aspect of the subject matter described in this specification can be embodied in computer-implemented methods that include capturing, by a camera on a user device, a plurality of successive images for display in an application environment of an application executing on the user device, performing an object recognition process on the images, the object recognition process including determining that a plurality of images, each depicting a particular object, are required to perform object recognition on the particular object, and in response to the determination, generating, within the application environment, a user interface element that indicates a camera operation to be performed, the camera option capturing two or more images, determining that a user, in response to the user interface element, has caused the indicated camera operation to be performed to capture the two or more images, and in response, determining whether a particular object is positively identified from the plurality of images, and in response to determining that the particular object is positively identified, eliminating the user interface element that indicates the camera operation to be performed and generating a user interface element that indicates the positive identification of the particular object, and in response to determining that the particular object is not positively identified, maintaining the user interface element that indicates the camera operation to be performed. Other embodiments of this aspect include corresponding apparatus, methods, systems, and computer programs, configured to perform the actions of the methods, encoded on computer storage devices.

These and other aspects can each optionally include one or more of the following features. In some aspects, the user interface element includes a first interface element that indicates capturing images of the particular object from multiple angular positions relative to a current angular position of the camera to the particular object. In some aspects, the user interface element includes a second user interface element that is different from the first user interface element and that indicates capturing an image of the particular object from a particular angular position relative to a current angular position of the camera to the particular object.

In some aspects, the user interface element indicates capturing an image of the particular object at a zoom level that is different from a current zoom level of the camera.

In some aspects, the step of determining whether a particular object is positively identified from the plurality of images includes sending, by the application executing on the user device, the collected plurality of images to an object recognition server, and receiving, at the user device from the object recognition server, an indication of whether the particular object is positively identified. In some aspects, sending the collected plurality of images to the object recognition server includes determining, based on a bandwidth criteria, a number of images of the plurality of images that depict the particular object from a particular angle, and sending the number of images to the object recognition server.

In general, another innovative aspect of the subject matter described in this specification can be embodied in computer-implemented methods that include receiving, by an image processing component, an image depicting an object obtained from a camera device, determining that a particular object is not positively identified from the image, and in response providing data that causes an application environment of an application executing on a user device in which is displayed successive images captured by the camera on the user device to display a user interface element that indicates a camera operation to be performed, receiving, in response to the camera operation being performed, a plurality of images captured by the camera operation performed, determining whether a particular object is positively identified from the plurality of images, and in response to determining that the particular object is positively identified, providing data that causes the user interface element that indicates the camera operation to be performed to be eliminated and that causes a user interface element that indicates the positive identification of the particular object to be displayed in the application environment, and in response to determining that the particular object is not positively identified, providing data that causes the user interface element that indicates the camera operation to be performed to be maintained within the application environment. Other aspects of this aspect include corresponding apparatus, methods, systems, and computer programs, configured to perform the actions of the methods, encoded on computer storage devices.

These and other aspects can each optionally include one or more of the following features. In some aspects, determining whether the particular object is positively identified from the plurality of images includes iteratively updating a weighted average until a weighted average threshold is exceeded. In some aspects, each iteration includes performing object recognition on each image to determine if the particular object is recognized as one or more identified objects, where for each particular object that is recognized as one identified object for a particular image, assigning a weight for the one identified object for the particular image, for each particular object that is recognized as two or more identified objects for a particular image, assigning a distributed equal weight to each of the two or more identified objects for the particular image, determining if the weighted average exceeds the weighted average threshold.

In some aspects, determining whether the particular object is positively identified from the plurality of images includes creating, from the plurality of images, a composite image, and performing object recognition on the composite image.

In some aspects, determining whether the particular object is positively identified from the plurality of images includes creating, from the plurality of images, a panoramic image, and performing object recognition on the panoramic image.

In some aspects, providing data that causes an application environment of an application executing on the user device in which is displayed successive images captured by a camera on the user device to display the user interface element that indicates a camera operation to be performed includes determining one of a plurality of camera operations to be performed, wherein each camera operation has a corresponding user interface element that indicates the camera operation and that is different from each user interface element for each other camera operation, and providing to the user device data that causes the user interface element for the determined one of the plurality of camera operations to be displayed.

In general, another innovative aspect of the subject matter described in this specification can be embodied in computer-implemented methods that include providing images captured by a camera on a user device, sending, at a first frequency and from the user device, the images to an object recognition server, receiving, at the user device and from the object recognition server, an indication that a particular object within an image is not positively identified from the images sent to the server, in response to receiving the indication that the particular object is not positively identified, sending, at a second frequency higher than the first frequency, the images to the object recognition server, receiving, at the user device from the object recognition server, an indication that the particular object is positively identified, and in response to receiving the indication that the particular object is positively identified, ceasing to send images from the user device to the object recognition server at the second frequency. Other aspects of this aspect include corresponding apparatus, methods, systems, and computer programs, configured to perform the actions of the methods, encoded on computer storage devices.

These and other aspects can each optionally include one or more of the following features. In some aspects, the method can further include in response to receiving the indication that the particular object is not positively identified, generating a user interface element indicating a camera operation to be invoked by the user during an object recognition process, wherein the camera operation involves capturing two or more images, and wherein the step of sending images at the second frequency to the object recognition server is conditional upon performance of the camera operation. In some aspects, the method can further include in response to receiving the indication that the particular object is positively identified, eliminating the user interface element that indicates the camera operation to be performed and generating a user interface element that indicates the positive identification of the particular object.

Particular embodiments of the subject matter described in this specification can be implemented so as to realize one or more of the following advantages. Providing real-time user interface elements, or visual indicators, representing an object recognition process to a user on a mobile device displaying an image of interest allows the user to provide feedback and assist in the object recognition process. Presenting user interface elements for intermediary steps in the object recognition process to a user can help to identify potential problems in the object recognition process during one or more of the steps. Moreover, should the object recognition process fail to identify an object, the use of user interface elements can help the user understand at which point the object recognition process is failing. This reduces or eliminates the need for instrumenting an object recognition process to provide, for example, data logging describing pass events and fail events during the process. Accordingly, the technological fields of object recognition processing and process troubleshooting are improved.

Moreover, providing visual indicators about acquiring multiple angles of an object may assist a user in selecting a second image if a first image is determined to be unsuitable for the object recognition process. The visual indicators selected to represent the steps of an object recognition process may be built around a human-computer interaction model to provide an improved intuitive user experience. Moreover, introducing latency into the object recognition process may allow a user to more easily visually understand a process that otherwise may occur too quickly for user comprehension.

In accordance with some aspects described herein, bandwidth usage may be controlled by directing the user through the user interface elements to take key image frames in the user interface (e.g. different angles), and only sending the server the selected key frames to be analyzed for object recognition. This can result in more efficient utilization of bandwidth and computing resources.

With conventional user interfaces, a user may not know to move the camera of the user device to different angles for a candidate object in order to perform object recognition. An effective user interface would ideally enable the user to readily and rapidly access the right data/functionality. The object recognition application of the present system can present visual indications for a user to obtain images of an object from different angles. For example, the user can be viewing on the mobile device an object of interest using the object recognition application, but the current angle or view of the object is unable to recognize the object with the current image data. The object recognition application, through a user interface element generator, presents user interface elements (e.g., virtual indicators, arrows, etc.) to the user to obtain images of the object from another angle. Thus, the present system enables the user to readily and rapidly access the angle of the object with ease and speed of navigation, particularly on small screen devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
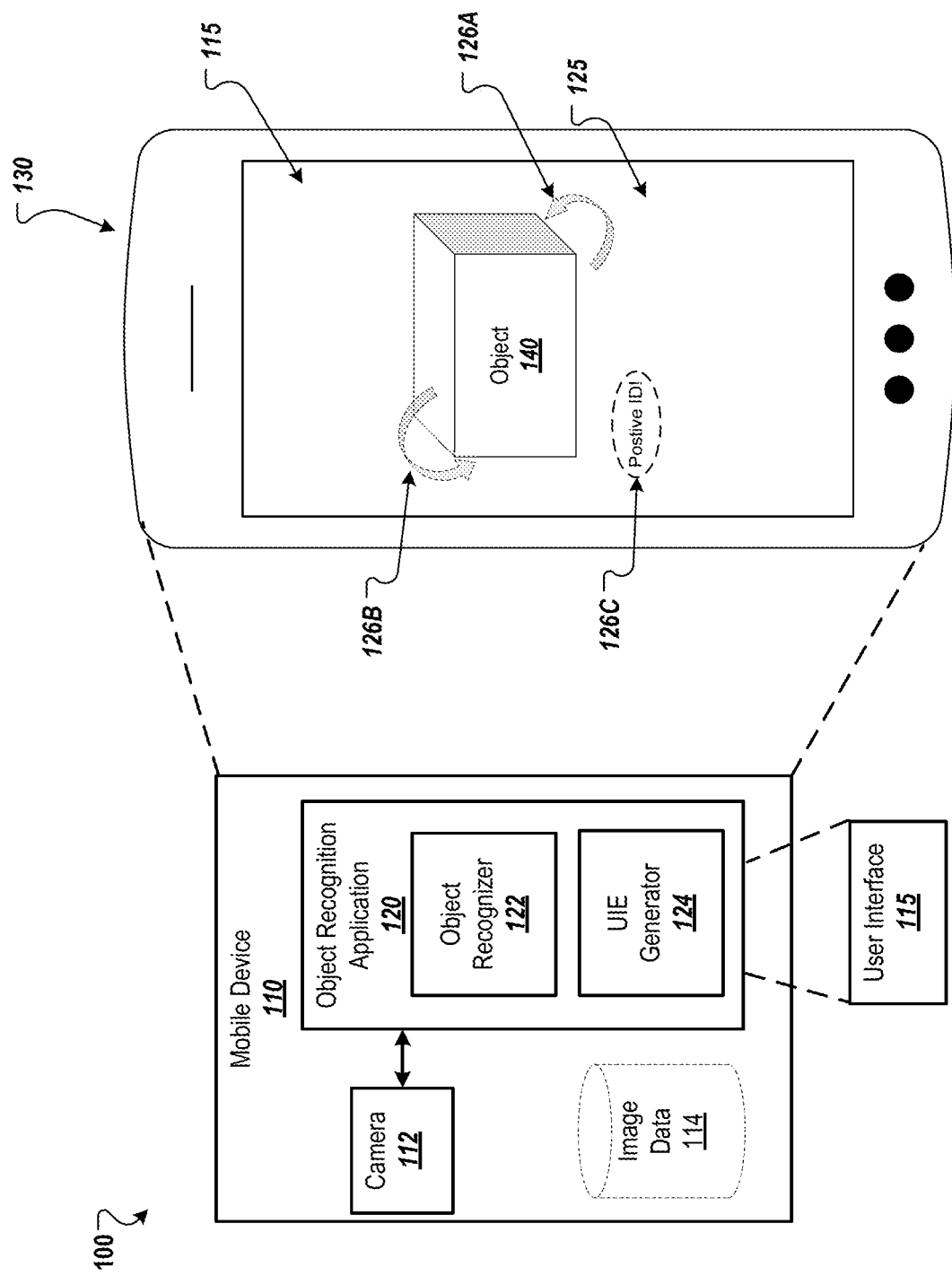
FIG. 1 is a block diagram of an example environment in which an object recognition process may occur on a mobile device of a plurality of images displayed on the mobile device.

Described below are systems and methods for generating, within an application environment in which a plurality of images are successively displayed on a user device, user interface elements that indicate camera operations to be invoked by the user during an object recognition process performed on the images. The images may be single images captured by a camera operation, or constitute images of a video captured by a video process. Thus, as used in this specification, the term "image frame" may be either a single image, such as still image of a photograph, or may be an "image frame," such as one of multiple frames from a video. For brevity, the term "image frame" is used for both image types.

In some aspects, the technology is related to systems and methods for receiving the image frames to determine whether a particular object is positively identified from the plurality of image frames and determine whether the user interface element to direct the user to take additional image frames of the particular object should be maintained. Alternatively, the system may determine whether the user interface elements should be shown to direct the user to obtain different images of the object.

In particular, this technology focuses on an object recognition application that guides users to take multiple images (e.g., from multiple angles, or multiple zoom levels) using user interface elements as well as the underlying technology that merges the results from these various frames. In some aspects, the object recognition application on the mobile device can perform the object recognition process and select and generate the user interface elements to be displayed on the mobile device. In other aspects, a server can receive several of the images from a user device (received in a short timeframe), and then perform objection recognition to determine whether the particular object is positively identified from the plurality of image frames. In some aspects, the server can also determine which user interface elements should be displayed to the user and send that information to the object recognition application on the user device.

Performing object recognition may include a weighted average routine, a composite image routine, a panoramic image routine, or a combination thereof. A weighted average routine may be used to calculate a percentage of likelihood for each individual frame and calculate if the weighted average is above a certain threshold. A composite image routine could create a composite image from the image frames by using known techniques to create a higher definition image (e.g. reduce glare, remove artifacts), then perform object recognition with a higher likelihood of positively identifying the particular object. A panoramic image routine may be used to create a wide-angle view around a particular object, then perform object recognition with a higher likelihood of positively identifying the particular object. For example, the panoramic image routine could identify a certain object from a particular angle, e.g., a unique pocket on the other side of a purse that signifies a particular brand.

In some aspects, image frames from a camera of a mobile device may be transmitted to an object recognition server at a first frequency (e.g., every tenth image frame) until such time as it is determined by the server that a particular object cannot be positively identified from one or more image frames sent to the server. In response, images may be sent to the server from the mobile device at a second frequency higher than the first frequency (e.g., the second frequency may be every second image frame) until such time as positive identification is possible. This increase in frequency may be dependent upon performance of a camera operation which may be indicated by a user interface element.

To perform the above operations, the systems and methods utilize an object recognition application to display user interface elements on a mobile device to identify objects from different angles. In particular, the system includes an object recognizer component and a user interface element generator component. Each component can reside on the mobile device, on a server, or a combination thereof. In operation, the object recognizer component processes an image or a plurality of images to identify an object of interest. The user interface element generator component creates user interface elements that are displayed on the user interface of a mobile device.

In some aspects, the methods described herein are performed entirely on the mobile device. In other aspects, the system can include an object recognition system in connection with the mobile device over a network. In particular, the object recognition system can include back-end servers with an object recognition engine and a user interface element selector engine. The object recognition engine can process image or images sent from the mobile device and identify an object of interest. The user interface element selector engine can send data to a user interface element generator within an object recognition application on the mobile device to generate user interface elements to instruct the user to acquire additional images of the object of interest from a different angle.

These features and additional features are described in more detail below.

FIG. 1 is a block diagram of an example environment 100 in which an object recognition application 120 can perform an object recognition process on a plurality of image frames displayed in an application environment of a mobile device. FIG. 1 further depicts an example screen shot 130 of mobile device 110 that illustrates an object 140 within an application environment of the object recognition application 120.

The object recognition application 120 can be installed on and/or executed by a mobile device 110. The mobile device 110 is an electronic device capable of requesting and receiving resources over a data communication network. Example mobile devices 110 include smart phones, tablet computing devices, wearable computing devices (e.g., smart watches), and other devices that can send and receive data over the data communication network.

The mobile device 110 can also run a variety of applications. An application on a mobile device 110 can include an application environment, e.g., a graphical user interface (GUI) 115, in which images may be shown. Examples of such applications are camera-enabled applications that can use an on-device camera, such as camera 112, to capture an image, applications that can receive images and display images, and applications that can access and display images that are stored on the mobile device 110. For example, an application may have access to a repository of image data 114 stored on the mobile device 110, where the application environment can load an image from the image data 114.

The object recognition application 120 can be implemented as a native application developed for a particular platform or a particular device, a web browser that provides a web interface, or another appropriate type of application. The object recognition application 120 performs object recognition on an image or a plurality of image frames within an application environment on the mobile device 110. For example, the object recognition application 120 can include an object recognizer 122 that attempts to detect and recognize (e.g., identify) objects in pixel data (or images). The object recognizer 122 can detect various objects, such as people, barcodes, landmarks, paintings, vehicles, and/or other types of objects using edge detection and/or other object recognition techniques. The object recognizer 122 can access the displayed image data by means of an application programing interface (API).

The object recognition application 120 can generate, within the application environment in which the plurality of images are successively displayed, user interface elements that indicate camera operations to be invoked by the user during an object recognition process. For example, the object recognition application 120 can include a user interface element generator 124 that generates, updates, and presents user interface elements 126A-126C (hereinafter generally referred to as user interface elements 126). The interface element generator 124 can display the user interface elements 126 through the user interface 115 on the mobile device 110. The particular user interface elements 126A, 126B, and 126C are shown at the same time for illustrative purposes. For example, user interface element 126A could be generated separately to invoke a user to obtain images from the side of the object the arrow is pointing to. User interface element 126B could be generated separately to invoke a user to obtain images from the side of the object the arrow is pointing to, which is the opposite side that user interface element 126A is pointing to. User interface element 126C could be generated separately to indicate to the user a positive identification of the object 140.

In some aspects, a combination of user interface elements 126 can be shown at the same time to invoke particular camera operations. For example, multiple indicators may be shown to make it clear to a user that multiple different angular positions may be required to produce a panoramic image, for example. According to some aspects, the user interface element could be an animation, a video, an audio indication, instructions to the user in a text block, any other type of media content, or any combination thereof.

The user interface element generator 124 can select and configure the user interface elements 126 based on an object recognition process. For example, the screen 130 of mobile device 110 depicts an object 140 within the application environment of the object recognition application 120. After the object 140 is shown using the object recognition application 120, and if the object is not positively identified, the user interface element generator 124 can generate and display user interface element 126A or 126B, for example, to instruct the user to capture images from a different angle angular position relative to a current angular position of the camera to the particular object. When an object is positively identified, the user interface elements instructing a camera operation to be performed, such as 126A or 126B, are eliminated, and user interface element 126C can be generated and displayed. User interface element 126C indicates that there is a positive identification of the object 140 during the object recognition process.

Figure 2:
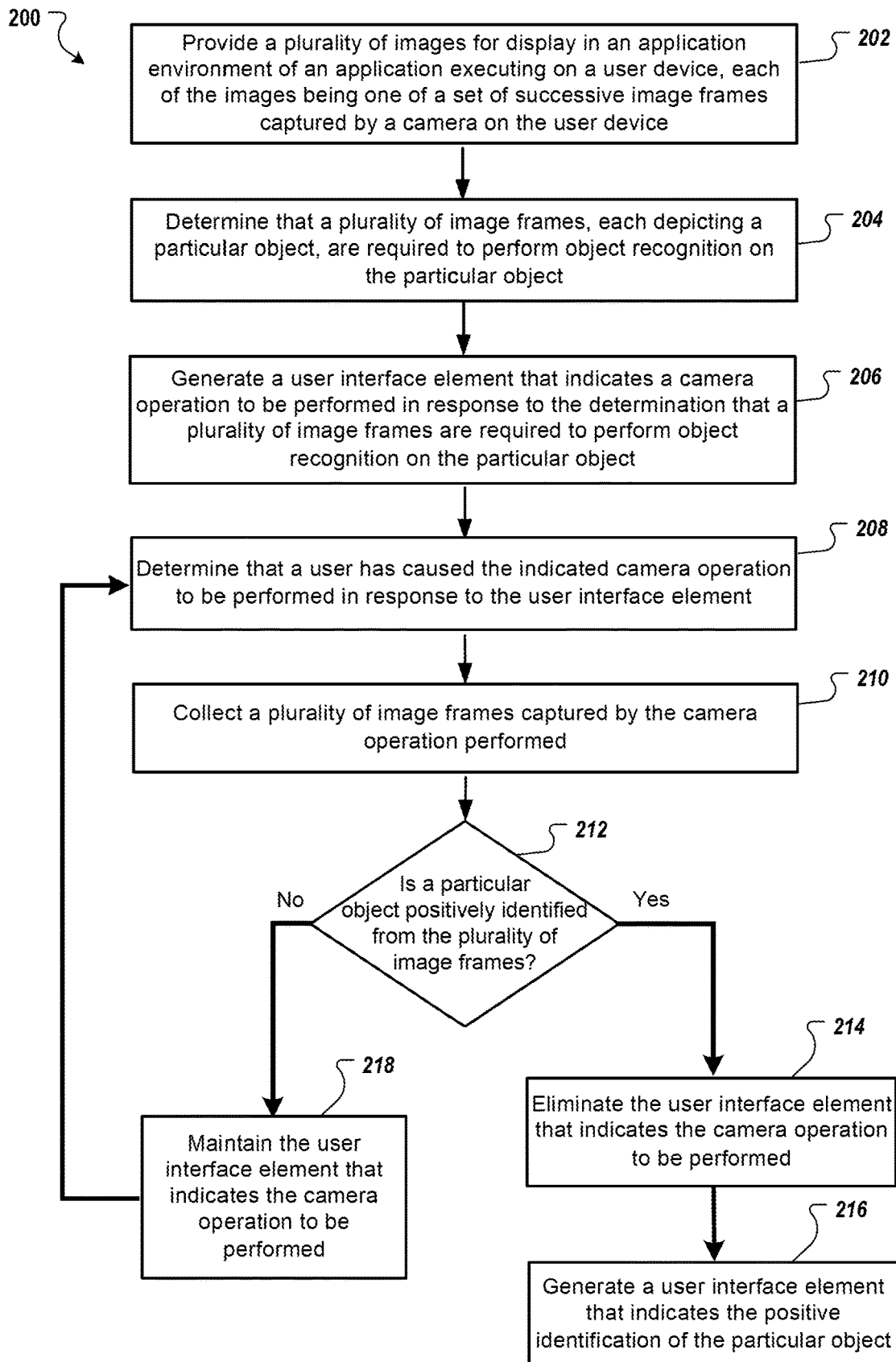
FIG. 2 is a flow diagram of an example process for object recognition of images displayed on a mobile device.

FIG. 2 is a flow diagram of an example process 200 for object recognition of a plurality of images displayed on a mobile device.

The process 200 provides a plurality of images for display in an application environment of an application executing on a user device, each of the images being one of a set of successive image frames captured by a camera on the user device (202). As shown in FIG. 1, the object recognition application 120 is being executed, and images are displayed on the user interface 115 from image frames captured by the camera 112 of the mobile device 110. The images so collected may be locally stored on the mobile device 110 in a repository of image data 114, for example, in a photo application on the mobile device 110. The images may also be stored on a user's cloud service, or a cloud-based image application. The images may also be "live" images, where each image is composed of pixel data received through a camera in an active viewport of a camera application environment 110 on a mobile device 110, without capturing and saving the image locally or on a cloud-based storage.

The process 200, during an object recognition process, determines that a plurality of image frames, each depicting a particular object, are required to perform object recognition on the particular object (204). For example, the object recognizer 122 of the object recognition application 120 on the mobile device 110 may access and execute multiple different object recognition models to perform object recognition of the object 140.

The process 200 generates, within the application environment in which the plurality of images are successively displayed, a user interface element that indicates a camera operation to be performed in response to the determination that a plurality of image frames are required to perform object recognition on the particular object, where each camera operation involves capturing two or more image frames (206). For example, as shown in screen shot 130 of FIG. 1, the user interface element generator 124 creates user interface element 126A to indicate to the user to capture an image frame from a different angular perspective.

The process 200 determines that a user has caused the indicated camera operation to be performed in response to the user interface element (208). After determining that a user has caused the indicated camera operation to be performed in response to the user interface element, the process 200 collects a plurality of image frames captured by the camera operation performed (210). For example, after user interface element 126A is displayed to a user, the system can detect whether the user has obtained new images using the camera 112 of the mobile device 110.

The process 200 determines whether a particular object is positively identified from the plurality of image frames that were captured after the user caused the indicated camera operation to be performed (212). If the determination is "YES" to the decision branch at step 212, then the process 200 proceeds to eliminate the user interface element that indicates the camera operation to be performed (214). The process 200 then generates a user interface element that indicates the positive identification of the particular object (216). For example, as shown in screen shot 130, if user interface element 126A was originally shown to the user to capture additional data from the angular position as indicated, and the object 140 was positively identified, then the object recognition application 120 would remove user interface element 126A, and display user interface element 126C, e.g., "Positive ID."

If the determination is "NO" to the decision branch at step 212, then the process 200 proceeds to maintain the user interface element that indicates the camera operation to be performed (218). Then the process 200 returns to step 208 to determine that a user has caused the indicated camera operation to be performed in response to the user interface element. For example, if user interface element 126A was originally shown to the user to capture additional data from the angular position as indicated, and the object 140 was not positively identified, then the object recognition application 120 would maintain the user interface element 126A. In some aspects, the object recognition application 120 can display additional user interface elements 126 to make it more clear to the user the additional image frames that may be needed for a positive identification.

According to some aspects, the user interface element can include a first interface element that indicates capturing an image frame of the particular object from multiple angular positions relative to a current angular position of the camera to the particular object. According to some aspects, the user interface element includes a second user interface element that is different from the first user interface element and that indicates capturing an image frame of the particular object from a particular angular position relative to a current angular position of the camera to the particular object. For example, the user interface element could be an animated image that indicates taking multiple pictures from several different angles, and not just one other angle as shown for user interface element 126A or 126B in screenshot 130. The user interface element as an animated image could depict a person holding a mobile device or other camera device, such as an augmented reality (AR) sticker, on the live view of the application environment. For example, the animated person could be shown walking around the particular object, collecting image frames as they walk around. Other indicators could be used for the user interface elements 126, depending on the camera operation the system determines is needed to identify the object. In some implementations, the interface elements are show adjacent to the object being detected, such as element 126A in FIG. 1. In other implementations, the interface elements may be descriptive text shown at a fixed location, e.g., the bottom of a camera window and reading "Take images of the side and back of the object you are trying to detect."

According to some aspects, the user interface elements 126 can include capturing an image frame of the particular object at a zoom level that is different from a current zoom level of the camera. For example, the user interface elements 126 could be an icon, an animation, or the like, that shows the user to zoom in or zoom out.

According to some aspects, the processes described herein are all performed on the mobile device 110. However, according to some aspects, determining whether a particular object is positively identified from the plurality of image frames includes sending, by the application executing on the user device, the collected plurality of image frames to an object recognition server, and receiving, at the user device from the object recognition server, an indication of whether the particular object is positively identified. According to some aspects, sending the collected plurality of image frames to the object recognition server includes determining, based on a bandwidth criteria, a number image frames of the plurality of image frames that depict the particular object from a particular angle, and sending the number of image frames to the object recognition server. These aspects of using an object recognition server, also referred to herein as an object recognition engine, which is a back-end server within an object recognition system, are further described below.

Figure 3:
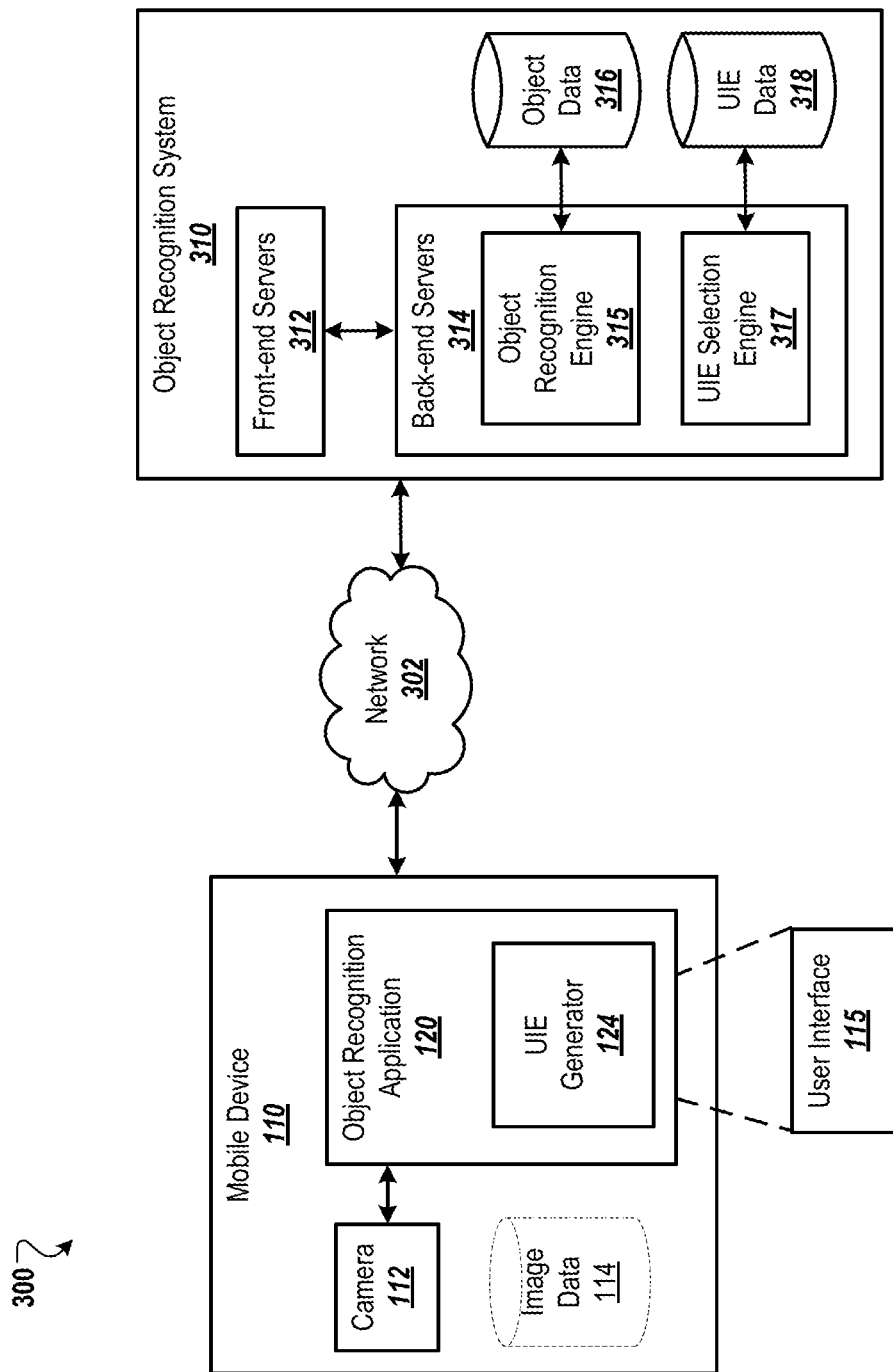
FIG. 3 is a block diagram of an example environment in which an object recognition process may occur between a server and a mobile device of a plurality of images displayed on the mobile device.

FIG. 3 is a block diagram of an example environment 300 in which an object recognition process may occur of a plurality of image frames displayed on a mobile device. A computer network 302, such as a local area network (LAN), wide area network (WAN), the Internet, or a combination thereof, connects mobile devices 110, and the object recognition system 310. The online environment 100 may include many thousands of mobile devices 110.

The object recognition system 310 can perform object recognition for the mobile device 110 based on the image data received from the mobile device 110. In some aspects, the object recognition system 310 can select which user interface elements are to be displayed by the mobile device 110. The object recognition system 310 includes one or more front-end servers 312 and one or more back-end servers 314. The front-end servers 312 can receive the image data from the mobile devices 110 and provide the data to the back-end servers 314. The front-end servers 312 can also send data to the mobile devices 110 in response to receiving the image data.

The back-end servers 314 includes an object recognition engine 315 that can perform an object recognition process in response to the image data received from the mobile devices 110. As used herein, the term engine refers to a data processing apparatus that performs a set of tasks. The object recognition engine 315 can use object data from an object data storage unit 316 (e.g., one or more hard drives, flash memory, etc.) that stores data the object recognition engine 315 can utilize to perform object recognition.

In some aspects, the back-end servers 314 includes a user interface element selection engine 317 that can select, from the data stored in the user interface element data storage unit 318, one or more user interface elements that are most relevant to the image data received from the mobile device 110. The user interface element selection engine 317 can then provide data to the user interface element generator 124 of the object recognition application 120 of the mobile device 110 to generate the selected user interface element to be displayed on the user interface 115.

Figure 4:
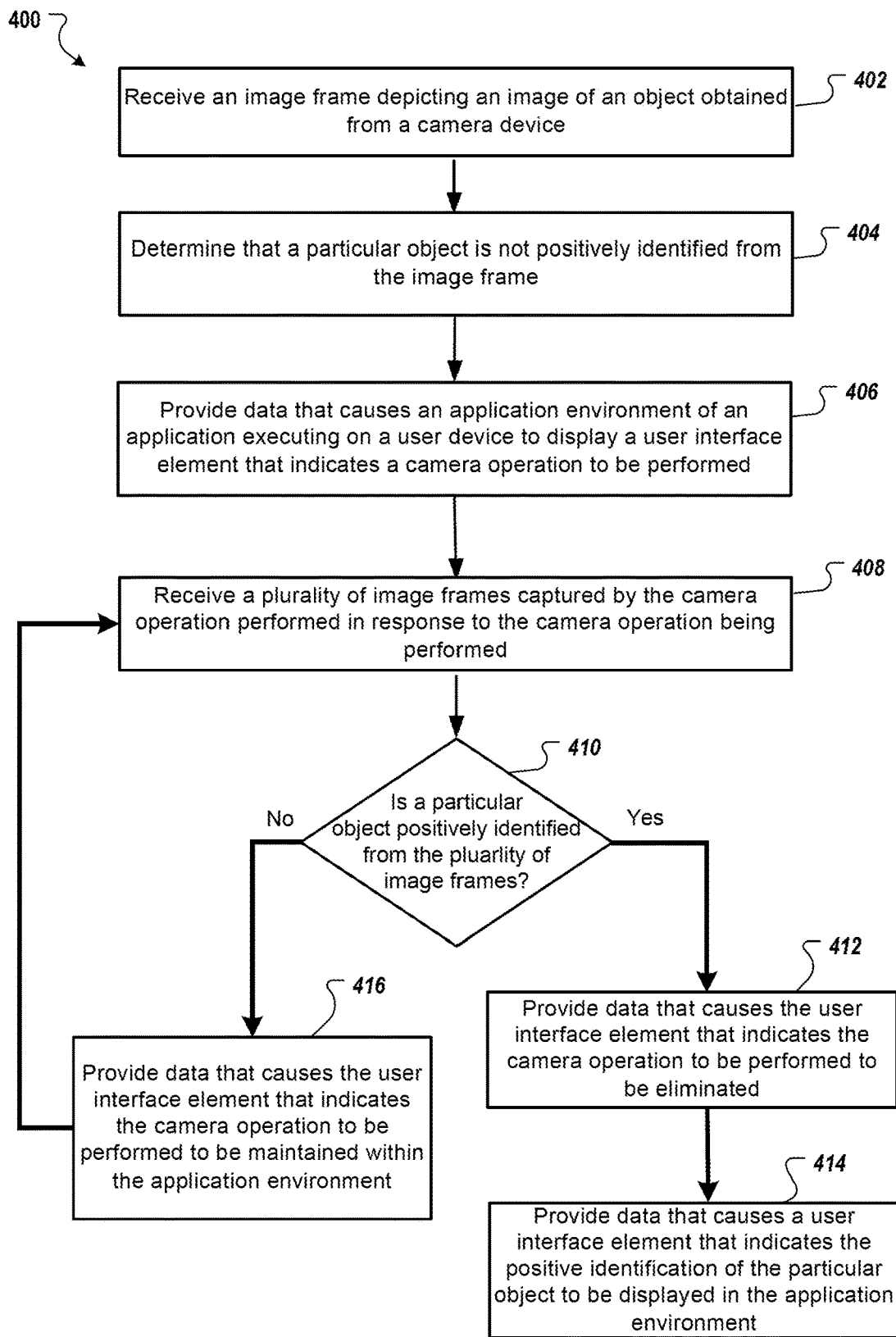
FIG. 4 is a flow diagram of an example process for object recognition of a plurality of images from a mobile device.

FIG. 4 is a flow diagram of an example process 400 for object recognition of a plurality of images from a mobile device. The process 400 can be implemented, for example, by the object recognition system 310 in communication with mobile device 110 of FIG. 3.

The process 400 receives an image frame depicting an image of an object obtained from a camera device (402). For example, the object recognition system 310 can receive an image from the mobile device 110 captured by the camera 112 through the network 302.

The process 400, determines that a particular object is not positively identified from the image frame (404), and provides data that causes an application environment of an application executing on a user device in which is displayed successive image frames captured by a camera on the user device to display a user interface element that indicates a camera operation to be performed (406). For example, the object recognition engine 315 can analyze the image received from the mobile device 110 and perform object recognition. If the object recognition engine 315 does not positively identify an object, such as object 140, then the user interface element selection engine 317 can provide data to the object recognition application 120 to generate a user interface element, such as user interface element 126A, as shown in FIG. 1, to indicate a camera operation for a user to perform.

The process 400 receives a plurality of image frames captured by the camera operation performed in response to the camera operation being performed (408). For example, after a user is presented with user interface element 126A of FIG. 1, a user then captures additional images using the camera 112 of the mobile device 110. The object recognition application 120 would then trigger the mobile device to send the newly acquired images to the object recognition system 310.

The process 400 determines whether a particular object is positively identified from the plurality of image frames that were captured after the user caused the indicated camera operation to be performed (410). If the determination is "YES" to the decision branch at step 410, then the process 400 proceeds provide data that causes the user interface element that indicates the camera operation to be performed to be eliminated (412). The process 400 then provides data that causes a user interface element that indicates the positive identification of the particular object to be displayed in the application environment (414). For example, as shown in screen shot 130 in FIG. 1, if user interface element 126A was shown to the user to capture additional data from the angular position as indicated, and the object 140 was positively identified by the object recognition engine 315, then the user interface element selection engine 317 would send data to the user interface element generator 124 of the object recognition application 120 to remove user interface element 126A, and display user interface element 126C, "Positive ID." This would indicate to the user that object 140 was positively identified.

If the determination is "NO" to the decision branch at step 410, then the process 400 proceeds to provide data that causes the user interface element that indicates the camera operation to be performed to be maintained within the application environment (416). Then the process 400 returns to step 408 to receive a plurality of image frames captured by the camera operation performed in response to the camera operation being performed. For example, if user interface element 126A was originally shown to the user to capture additional data from the angular position as indicated, and the object 140 was not positively identified by the object recognition engine 315, then the user interface element selection engine 317 would send data to the user interface element generator 124 of the object recognition application 120 to maintain the user interface element 126A. In some aspects, the user interface element selection engine 317 can send data to the user interface element generator 124 to generate additional user interface elements 126 to make it more evident to the user that additional image frames are needed for a positive identification. In some aspects, the object recognition application 120 can determine whether to display additional user interface elements 126.

According to some aspects, performing object recognition and determining whether the particular object is positively identified from a plurality of image frames can include a weighted average routine, a composite image routine, a panoramic image routine, or a combination thereof. According to some aspects, these routines can be performed by the object recognition application 120 on the mobile device 110 of FIG. 1. According to some aspects, these routines can be performed by the object recognition engine 315 of FIG. 3.

According to some aspects, determining whether the particular object is positively identified from the plurality of image frames can include iteratively updating a weighted average until a weighted average threshold is exceeded. Each iteration could include performing object recognition on each image frame to determine if the particular object is recognized as one or more identified objects. For each particular object that is recognized as one identified object for a particular frame, a weight can be assigned for the one identified object for the particular frame. For each particular object that is recognized as two or more identified objects for a particular frame, distributed weight can be assigned to each of the two or more identified objects for the particular frame. Finally, determining whether the particular object is positively identified from the plurality of image frames can be determined if the weighted average exceeds the weighted average threshold. For example, for four frames of image data, the object recognition analysis may determine that for the object 140 in FIG. 1, frame 1 is 85% vendor-1 bag, frame 2 is 50% vendor-1 bag, and 50% vendor-2 bag, frame 3 is 90% vendor-1 bag, and frame 4 is 50% vendor-1 bag, and 50% vendor-3 bag. For this example, the weighted average threshold is 60%. Thus, for this example of four image frames, the weighted average would be calculated at 68.75% for the vendor-1 bag. Based on the weighted average threshold, the weighted average routine would determine that object 140 is a vendor-1 bag. According to some aspects, a user interface element could be displayed that would provide the name of the vendor-1 bag, as well as additional information about the product, such as hyperlinks to a plurality of web resources or native applications installed on the mobile device 110 related to the product.

According to some aspects, determining whether the particular object is positively identified from the plurality of image frames can include creating a composite image from the plurality of image frames, and performing object recognition on the composite image. For example, multiple frames of the particular object, such as object 140 of FIG. 1, can be combined using know techniques for creating a high quality composite image to reduce glare, remove artifacts, and the like. The higher quality composite image can then provide a higher likelihood of a positive identification in the object recognition analysis.

According to some aspects, determining whether the particular object is positively identified from the plurality of image frames can include creating a panoramic image from the plurality of image frames, and performing object recognition on the composite image. For example, user interface elements could be generated by the system to indicate to the user that they need walk around the object and obtain images from all around the object to create a panoramic image to analyze.

According to some aspects, providing data that causes an application environment of an application executing on a user device in which is displayed successive image frames captured by a camera on the user device to display a user interface element that indicates a camera operation to be performed includes determining one of a plurality of camera operations to be performed. Each camera operation has a corresponding user interface element that indicates the camera operation and that is different from each user interface element for each other camera operation. Data can then be provided to the user device that causes the user interface element for the determined one of the plurality of camera operations to be displayed on the user device. For example, the user interface element selection engine 317 can determine which user interface element should be selected from the user interface element data store 318 based on the image data object recognition analysis from the object recognition engine 315. The user interface element selection engine 317 can then send data to the user interface element generator 124 to generate and display the selected user interface element on the user interface 115 of the mobile device 110.

Figure 5:
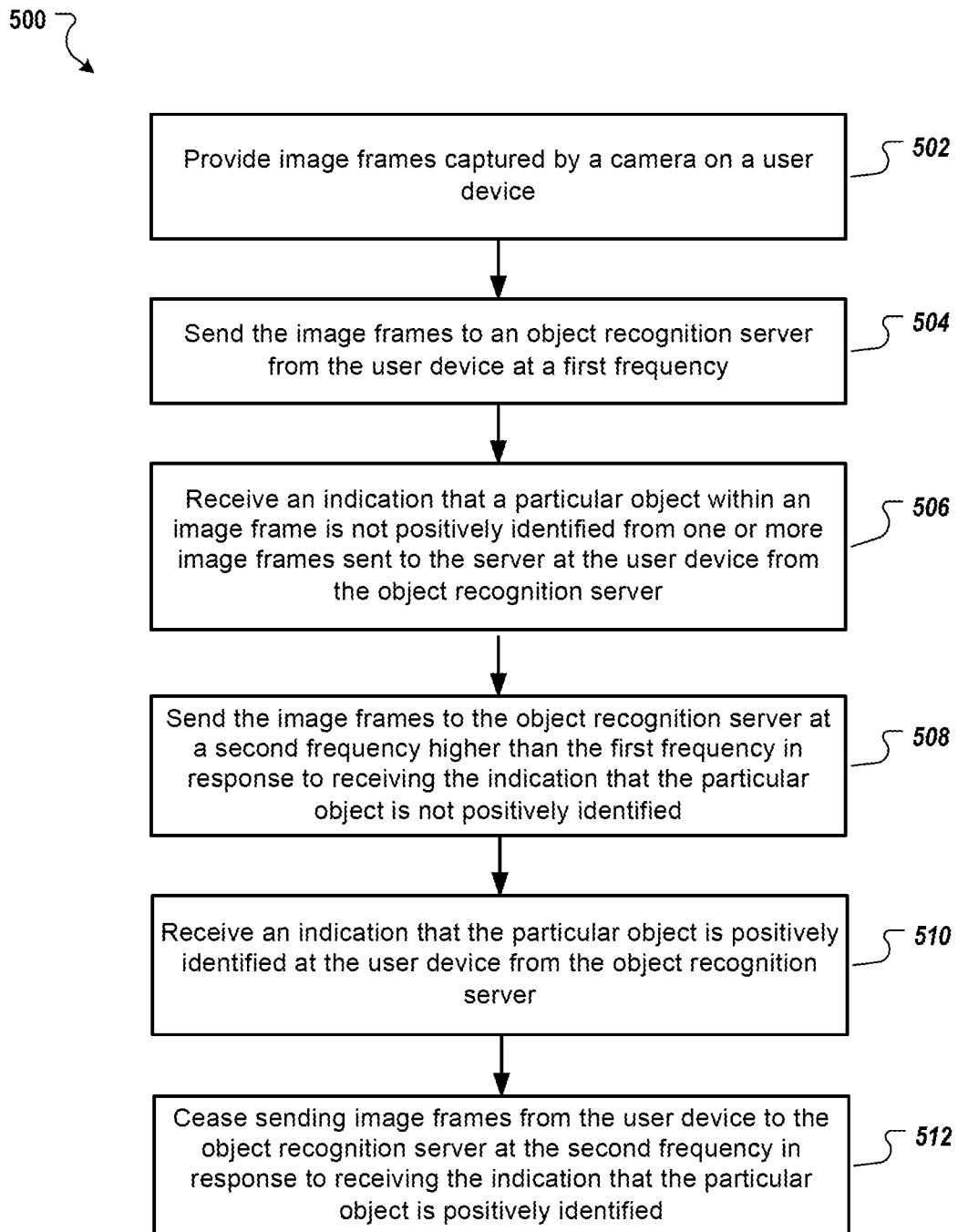
FIG. 5 is a flow diagram of an example process for transferring image data between a mobile device and a server for object recognition.

FIG. 5 is a flow diagram of an example process 500 for object recognition of a plurality of images from a mobile device. The process 500 can be implemented, for example, by the mobile device 110 in communication with the object recognition system 310 of FIG. 3.

The process 500 provides image frames captured by a camera on a user device (502). For example, when the object recognition application 120 is executed on the mobile device 110, images can be displayed on the user interface 115 from image frames captured by the camera 112 of the mobile device 110.

The process 500 sends the image frames to an object recognition server from the user device at a first frequency (504). For example, the mobile device 110 is in communication with the object recognition system 310 through the network 302, and the object recognition application 120 can send the images to the object recognition engine 315 at a first frequency. For example, images could be sent at one frame per second (FPS).

The process 500 receives an indication that a particular object within an image frame is not positively identified from one or more image frames sent to the server at the user device from the object recognition server (506). For example, the object recognition engine 315 can send the object recognition application 120 a notification that the object in the image frames has not been identified.

The process 500 sends the image frames to the object recognition server at a second frequency higher than the first frequency in response to receiving the indication that the particular object is not positively identified (508). For example, after receiving a notification from the object recognition system 310 that the object recognition engine 315 could not identify the object, the object recognition application 120 on the mobile device 110 can adjust the rate of sending images at a second frequency. For example, the next set of images could be increased and sent at three frames per second (FPS). According to some aspects, the object recognition system 310 could request a specific frequency for the images to be sent. According to some aspects, the object recognition application 120 could make the determination of what the second frequency should be adjusted to.

The process 500 receives an indication that the particular object is positively identified at the user device from the object recognition server (510). For example, once the object recognition engine 315 positively identifies an object in the image frames, the object recognition system 310 will send the object recognition application 120 a notification of the positive identification.

The process 500 ceases sending image frames from the user device to the object recognition server at the second frequency in response to receiving the indication that the particular object is positively identified (512). For example, after the object recognition application 120 receives a notification of the positive identification from the object recognition system 310, the object recognition application 120 stops sending new images.

According to some aspects, in response to receiving the indication that the particular object is not positively identified, a user interface element could be generated indicating a camera operation to be invoked by the user during an object recognition process, where the camera operation involves capturing two or more image frames. According to some aspects, the step of sending image frames at the second frequency to the object recognition server is conditional upon performance of the camera operation. For example, the object recognition application 120 would determine first if the user performed the indicated camera operation before sending the images to the object recognition system 310. This action would reduce bandwidth because then only the newly acquired images that the system determined to obtain by using user interface elements to instruct the user which images to capture would be sent from the mobile device 110 to the object recognition system 310.

According to some aspects, in response to receiving the indication that the particular object is positively identified, the user interface element that indicates the camera operation to be performed is eliminated, and a user interface element that indicates the positive identification of the particular object is generated. For example, as shown in FIG. 1 and discussed herein, user interface element 126A could be initially shown to the user to acquire more images, then after the object recognition engine identifies the object, user interface element 126A can be removed, and then user interface element 126C can be added to indicate to the user the object was positively identified.

Additionally, in some implementations, the user interface and the visual indicators can be tailored depending on the type of object the user is attempting to identify. In particular, for a first object vertical, a first user interface and first visual indicators can be used, and for a second object vertical different from the first object vertical, a second user interface and second user indicators different form the first user interface and first visual indicators can be used. For example, if a user is trying to identify a plant, the user interface can initially recognize that the object is a plant, but cannot determine what kind of plant without acquiring specific visual angles or images of specific features of the plant. For example, the user interface can indicate to the user to first acquire an image of the flower portion of the plant, then acquire an image of the leaves, and then finally acquire an image of the root. For some objects, the visual indicators may be tailored to provide specific angles or areas of the object. For example, for a shoe, the visual indicators may indicate to the user to acquire images from the side, a top view, and then a close up of the logo. The system described herein can then use all that information to improve the object recognition process.

Figure 6:
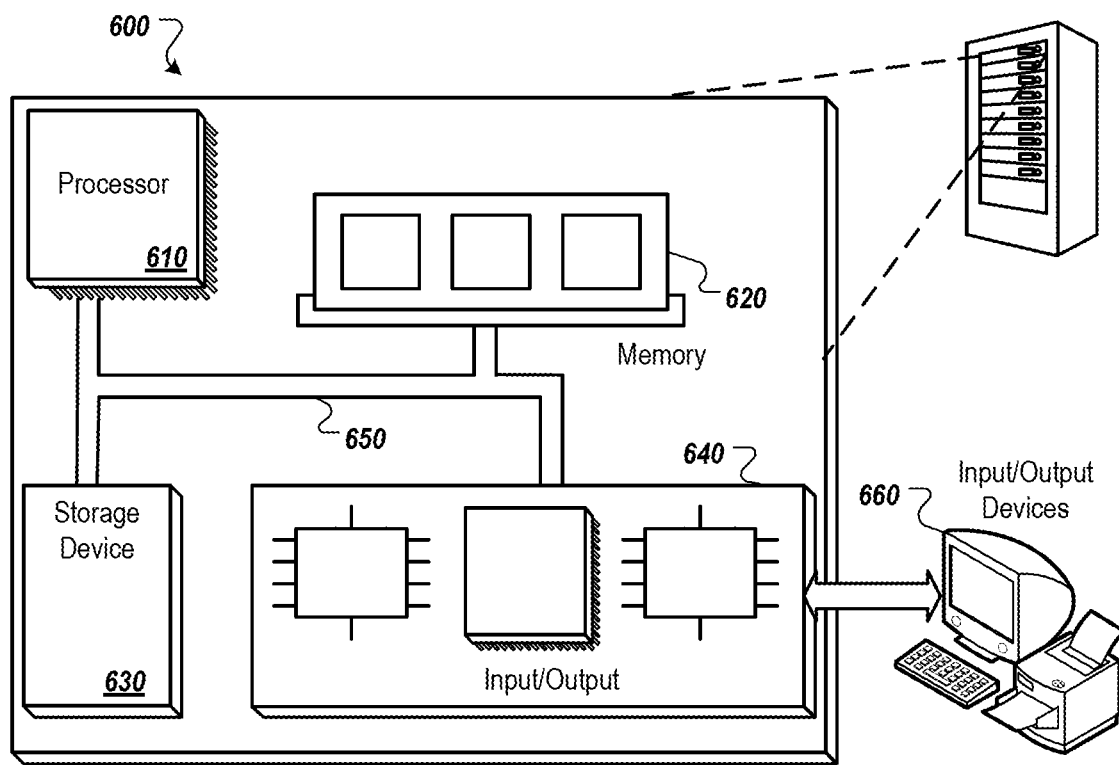
FIG. 6 is a block diagram of an example computer system that can be used to implement the methods, systems and processes described in this disclosure.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different aspects, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other aspects, however, can also be used, such as mobile computing devices, mobile communication devices, set-top box television client devices, etc.

Although an example processing system has been described in FIG. 6, aspects of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain aspects, multitasking and parallel processing may be advantageous.

What is claimed is:

1. A computer-implemented method, comprising:
   transmitting, by a user computing device comprising one or more processors, a first set of image data at a first frequency, wherein the first set of image data depicts a first object;
   in response to a failure to detect the first object in the first image data, receiving, by the user computing device, an indication of an object recognition error;
   in response to receipt of the indication of the object recognition error, transmitting, by the user computing device, a second set of image data at a second frequency higher than the first frequency, wherein the second set of image data depicts the first object; and
   in response to receiving, by the user computing device, an indication of a positive object identification, ceasing to transmit image data.

2. The computer-implemented method of claim 1, wherein:
   the first set of image data comprises a first plurality of images; and
   the second set of image data comprises a second plurality of images greater than the first plurality of images.

3. The computer-implemented method of claim 1, wherein:
   the first set of image data comprises video data captured at a first frame rate; and
   the second set of image data comprises video data captured at a second frame rate greater than the first frame rate.

4. The computer-implemented method of claim 1, wherein the object comprises a machine-readable code.

5. The computer-implemented method of claim 1, wherein:
   the user interface element is descriptive of one or more actions for the user to perform in response to the object recognition error.

6. The computer-implemented method of claim 1, wherein the method further comprises providing, by the user computing device for display in the application executed by the user computing device, a user interface element indicative of the successful recognition of the object.

7. The computer-implemented method of claim 1, wherein the user interface element comprises one or more of:
   an icon;
   an animation; or
   a descriptive text.

8. The computer-implemented method of claim 1, wherein:
   the user interface element is displayed adjacent to the object being recognized; or
   the user interface element is displayed at a fixed location.

9. A user computing device, the user computing device comprising:
   a camera device;
   one or more processors; and
   one or more non-transitory computer-readable media that collectively store instructions that, when executed by the one or more processors, cause the user computing device to perform operations, the operations comprising:
   transmitting a first set of image data at a first frequency, wherein the first set of image data depicts a first object;

in response to a failure to detect the first object in the first image data, receiving an indication of an object recognition error;

in response to receipt of the indication of the object recognition error, transmitting a second set of image data at a second frequency higher than the first frequency, wherein the second set of image data depicts the first object; and in response to receiving an indication of a positive object identification, ceasing to transmit image data.

10. The user computing device of claim 9, wherein:

the first set of image data comprises a first plurality of images; and the second set of image data comprises a second plurality of images greater than the first plurality of images.

11. The user computing device of claim 9, wherein:

the first set of image data comprises video data captured at a first frame rate; and the second set of image data comprises video data captured at a second frame rate greater than the first frame rate.

12. The user computing device of claim 9, wherein the object comprises a machine-readable code.

13. The user computing device of claim 9, wherein:

the user interface element is descriptive of one or more actions for the user to perform in response to the object recognition error.

14. The user computing device of claim 9, wherein the method further comprises providing, by the user computing device for display in the application executed by the user computing device, a user interface element indicative of the successful recognition of the object.

15. The user computing device of claim 9, wherein the user interface element comprises one or more of:

an icon;

an animation; or a descriptive text.

16. The user computing device of claim 9, wherein:

the user interface element is displayed adjacent to the object being recognized; or the user interface element is displayed at a fixed location.

17. One or more non-transitory computer-readable media that collectively store instructions that, when executed by one or more processors, cause the one or more processors to perform operations, the operations comprising:

transmitting a first set of image data at a first frequency, wherein the first set of image data depicts a first object;

in response to a failure to detect the first object in the first image data, receiving an indication of an object recognition error;

in response to receipt of the indication of the object recognition error, transmitting a second set of image data at a second frequency higher than the first frequency, wherein the second set of image data depicts the first object; and in response to receiving an indication of a positive object identification, ceasing to transmit image data.

18. The non-transitory computer-readable media of claim 17, wherein the first set of image data comprises a first plurality of images; and the second set of image data comprises a second plurality of images greater than the first plurality of images.

19. The non-transitory computer-readable media of claim 17, wherein: the first set of image data comprises video data captured at a first frame rate; and the second set of image data comprises video data captured at a second frame rate greater than the first frame rate.

* * * * *